(12) United States Patent
Busila et al.

(10) Patent No.: US 12,111,953 B2
(45) Date of Patent: Oct. 8, 2024

(54) SENSITIVE DATA DETECTION AND REPLACEMENT

(71) Applicant: SERVICENOW CANADA INC., Montreal (CA)

(72) Inventors: Elena Busila, Montreal (CA); Jerome Pasquero, Montreal (CA); Patrick Lazarus, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 489 days.

(21) Appl. No.: 17/287,640

(22) PCT Filed: Oct. 25, 2019

(86) PCT No.: PCT/CA2019/051515
§ 371 (c)(1),
(2) Date: Apr. 22, 2021

(87) PCT Pub. No.: WO2020/082187
PCT Pub. Date: Apr. 30, 2020

(65) Prior Publication Data
US 2021/0357512 A1     Nov. 18, 2021

Related U.S. Application Data

(60) Provisional application No. 62/751,159, filed on Oct. 26, 2018.

(51) Int. Cl.
*G06F 21/62*     (2013.01)
*G06F 21/60*     (2013.01)
(Continued)

(52) U.S. Cl.
CPC ......... *G06F 21/6254* (2013.01); *G06F 21/60* (2013.01); *G06F 40/166* (2020.01);
(Continued)

(58) Field of Classification Search
CPC ...... G06F 40/166; G06F 21/60; G06F 21/602; G06F 21/62; G06F 2221/2107
See application file for complete search history.

(56) References Cited

U.S. PATENT DOCUMENTS

2005/0289182 A1   12/2005   Pandian et al.
2008/0181396 A1    7/2008   Balakrishnan et al.
(Continued)

FOREIGN PATENT DOCUMENTS

CN      107679418 A       2/2018
DE   102014207439 A1     10/2015
(Continued)

*Primary Examiner* — Esther B. Henderson
(74) *Attorney, Agent, or Firm* — FASKEN MARTINEAU DUMOULIN LLP; Serge Lapointe (57) ABSTRACT

Systems and methods for privacy and sensitive data protection. An image of a document is received at a pre-processing stage and image pre-processing is applied to the image to ensure that the resulting image is sufficient for further processing. Pre-processing may involve processing relating to image quality and image orientation. The image is then passed to an initial processing stage. At the initial processing stage, the relevant data in the document are located and bounding boxes are placed around the data. The resulting image is then passed to a processing stage. At this stage, the type of data within the bounding boxes is determined and suitable replacement data is generated. The replacement data is then inserted into the image to thereby remove and replace the sensitive data in the image.

20 Claims, 3 Drawing Sheets

(51) Int. Cl.
  *G06F 40/166* (2020.01)
  *G06V 30/414* (2022.01)
  *G06V 30/416* (2022.01)
  *G06V 10/20* (2022.01)

(52) U.S. Cl.
  CPC .......... *G06V 30/414* (2022.01); *G06V 30/416* (2022.01); *G06V 10/20* (2022.01)

(56) References Cited

U.S. PATENT DOCUMENTS

| | | |
|---|---|---|
| 2010/0042583 A1 | 2/2010 | Gervais et al. |
| 2010/0205189 A1 | 8/2010 | Ebrahimi et al. |
| 2011/0239113 A1 | 9/2011 | Hung et al. |
| 2011/0258150 A1 | 10/2011 | Neogi et al. |
| 2016/0239668 A1 | 8/2016 | Bellert |
| 2017/0098097 A1* | 4/2017 | Van Eerd ............ G06F 21/6254 |
| 2017/0230369 A1* | 8/2017 | Chanda ................ H04L 63/062 |
| 2018/0276402 A1 | 9/2018 | Allen et al. |
| 2018/0293403 A1 | 10/2018 | Cheng et al. |
| 2018/0307942 A1 | 10/2018 | Pereira et al. |

FOREIGN PATENT DOCUMENTS

| | | |
|---|---|---|
| JP | 2011170509 A | 9/2011 |
| JP | 2014238642 A | 12/2014 |
| JP | 2017530460 A | 3/2016 |
| JP | 2017069599 A | 4/2017 |
| JP | 2013137740 A | 7/2023 |
| KR | 101585029 B1 | 1/2016 |
| RU | 2549515 C2 | 4/2015 |

\* cited by examiner

SENSITIVE DATA DETECTION AND REPLACEMENT

CROSS REFERENCE TO RELATED APPLICATIONS

The present application is a U.S. National Phase Application pursuant to 35 U.S.C. § 371 of International Application No. PCT/CA2019/051515 filed Oct. 25, 2019, which claims priority to U.S. Provisional Patent Application No. 62/751,159 filed Oct. 26, 2018. The entire disclosure contents of these applications are herewith incorporated by reference into the present application.

TECHNICAL FIELD

The present invention relates to document processing. More specifically, the present invention relates to systems and methods for replacing sensitive information in a document.

BACKGROUND

The early 21st century has been characterized with the rise and increasing ubiquity of machine learning in multiple industries. However, for machine learning to achieve next level penetration in the business world, machine learning has to be able to deal with the thousands of varied tasks that make businesses run. To be able to do this, machine learning systems will have to learn, refine, and, finally, execute such tasks. And, to be able to do this properly, machine learning systems will need access to large amounts of data. These large amounts of data can then be used to properly train such machine learning systems to implement various business processes.

It should be clear that such large amounts of data are available. Even with increasing use of automation in businesses, the business world still revolves around paper and its representations. As an example, business is still conducted with letters (on paper), with invoices (printed on paper), and receipts (printed on paper). While a paperless society has been much touted, the fact remains that paper is still widely used and, even if attempts are underway to phase out paper, it is unlikely that the form of the data on that paper will change any time soon. As an example of this, even paperless invoices and receipt still look the same as if they were printed on paper.

Such paper records, invoices, and documents can be used to train machine learning systems to perform such business processes. However, this path is fraught with issues stemming from another major concern of the information technology revolution: privacy. Real world documents such as invoices, credit card receipts, medical reports, etc. all have information that people will not want to be available to others. To this end, there is therefore a need for systems and methods that can preserve the data and the privacy of users while still allowing real world documents to be used in training data sets for machine learning systems. Preferably, such systems and methods would require little to no human intervention once they have been suitably launched.

SUMMARY

The present invention relates to systems and methods for privacy and sensitive data protection. An image of a document is received at a pre-processing stage and image pre-processing is applied to the image to ensure that the resulting image is sufficient for further processing. Pre-processing may involve processing relating to image quality and image orientation. The image is then passed to an initial processing stage. At the initial processing stage, the relevant data in the document are located and bounding boxes are placed around the data. The resulting image is then passed to a processing stage. At this stage, the type of data within the bounding boxes is determined and suitable replacement data is generated. The replacement data is then inserted into the image to thereby remove and replace the sensitive data in the image.

In a first aspect, the present invention provides a system for replacing sensitive data in documents, the system comprising:
- a pre-processing module for receiving an image of at least one document;
- a clustering module for subdividing said image of each of said at least one document into different fields, each field containing data;
- a data type determination module for recognizing specific types of data in said different fields to thereby determine if said data in said different fields comprises sensitive data; and
- a data replacement module for replacing sensitive data of at least one specific type of data in said different fields with replacement data.

In a second aspect, the present invention provides a method for adjusting an image of a document prior to said image being used as a data point in a data set, the method comprising:
- a) receiving said image;
- b) determining a location of sensitive data on said document in said image;
- c) determining a type of said sensitive data determined in step b);
- d) determining replacement data based on a type of said sensitive data determined in step c);
- e) inserting said replacement data into said image at said location to thereby replace said sensitive data with said replacement data.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
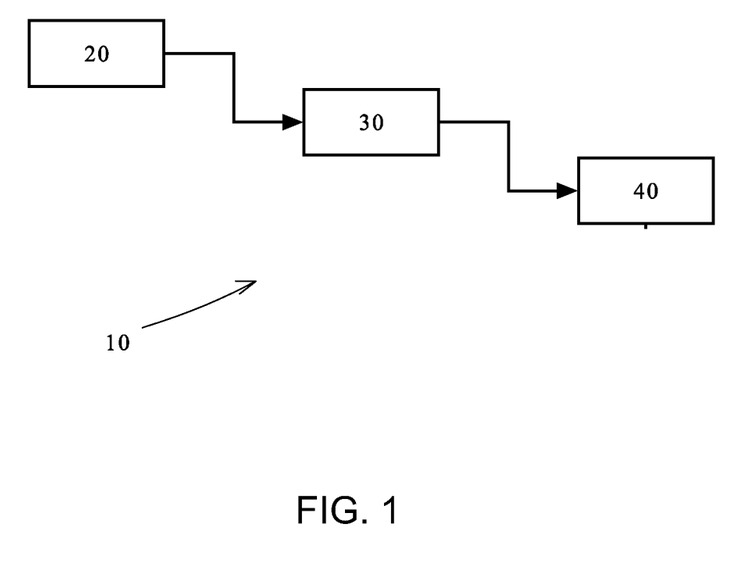
FIG. 1 is a block diagram of a system according to one aspect of the present invention.

Referring to FIG. 1, a block diagram according to one aspect of the invention is illustrated. This aspect of the invention includes a system 10 that has a pre-processing stage 20, an initial processing stage 30, and a processing stage 40.

The pre-processing stage 20 receives the image that contains at least one document. The pre-processing stage 20 determines if the image is of a sufficient image quality for further processing. To this end, the pre-processing stage may analyze the image's contrast, color, image size, orientation, and sharpness, as well as the presence or absence of any artefacts that may affect the image's clarity. If these image quality parameters are insufficient for further processing (e.g. the color balance and/or contrast is such that OCR cannot determine characters), the pre-processing stage adjusts these parameters as necessary. In addition to adjusting the contrast, color, geometry, and sharpness of the image, the pre-processing stage may also crop the image and/or remove artefacts that may affect the clarity of the image.

In addition to the above, the pre-processing stage may also adjust the orientation of the image to ensure easier processing of the data within. Specifically, the pre-processing stage may rotate the image to ensure that the image is square on a screen. This rotation may be a full 180 degree rotation (e.g. if the document is upside down in the image) or a partial rotation (e.g. if the document is at an angle within the image) as necessary. As well, the image may be geometrically translated (i.e. adjusted or moved to the left/right as necessary) to again, ensure that the image is square on the screen. This ensures that the resulting image is easier to process.

It should be clear that the adjustment of the various parameters of the image may be executed by various suitable image adjustment modules according to predetermined limits and/or standards. Such modules are well-known to those of skill in the art of image processing and/or image quality adjustment.

It should also be clear that, depending on the implementation, the pre-processing stage may also process the image to ensure that the image only shows/refers to a single document. If the image is a collection of images of multiple documents, the pre-processing stage may divide the original image into multiple images with each image only showing a single document.

After the pre-processing stage, the adjusted image is then sent to the initial processing stage. The initial processing stage analyzes the adjusted image of the document to locate the relevant data within the image and to place suitable bounding boxes around that data. In addition, the initial processing stage determines the type of data within the bounding boxes.

The initial processing stage determines the clusters of data within a document. The data extraction stage determines the clusters of data within the document, determines the type of data within each of the clusters of data, and places bounding boxes (where necessary) around the various individual clusters of data. The location (within the document) of each cluster of data is also determined and, where necessary, adjacent clusters of data are concatenated to form larger clusters. This may be necessary if the data in one cluster is part of a data set (e.g. one cluster has a first part of an address and its adjacent cluster has the second part of the address—these two clusters are concatenated to form a single cluster of data that contains the address).

For clarity, a clustering algorithm or process is applied to the document such that the pixels are segmented into blocks of logically consistent textual/conceptual data. As an example, the pixels containing a patient's name are grouped together and are clustered separately from a cluster of pixels (in a line below the patient's name) containing that patient's address.

It should be clear that the initial processing stage determines the type of data within each cluster of data within the document. This includes determining if the data within the cluster is an image, text (i.e. alphanumeric characters), a table, a signature, or any other type of data that may be encountered in a business document. In addition to determining this, the initial processing stage also determines the parameters of the cluster as well as the parameters of the data within the clusters. Thus, the initial processing stage can determine the size of the clusters (in pixels). This may mean determining the length, width, and height of the clusters in pixels or in any other suitable measurement units. For clusters of data containing text data, the initial processing stage can determine the font type as well as the font size of the text data. For image data, the size of the image, the lines within the image, the shapes within the image, as well as the presence of absence of text within the image may also be determined. For table data (i.e. the cluster data contains a table), the initial processing stage may determine the parameters of the data within the table. In addition to the above, the initial processing stage also recognizes font, size, style, spacing, etc. of the data (especially text data).

It should be clear that the initial processing stage not only determines clusters but also places bounding boxes where necessary to delimit the various clusters. Of course, the term "bounding boxes" also includes different shapes, sizes, and configurations for means and methods that delimit, delineate, or otherwise indicate a cluster of data and that is machine readable on the image. Such bounding boxes also includes boxes or shapes that are non-regular in shape, size, or orientation (e.g. at an angle).

It should also be clear that the initial processing stage can also determine the type of content in cluster data containing images. The initial processing stage can also be configured to determine whether the image data indicates that the cluster contains a logo, a signature, or a picture of some sort. As noted above, any text within the image can be determined and, where necessary, extracted and/or tagged for replacement/removal.

From the above, the initial processing stage would need to perform OCR functions on various clusters to determine the text within the clusters. For this function, a suitable OCR module may be used. As well, other modules specifically suited for the above noted tasks may be used. Thus, dedicated modules for cluster determination, cluster concatenation, image recognition, text parameter determination, image parameter determination, and other functions may be used. Of course, depending on the configuration of the system, multiple functions may be performed by one or more modules. A person of skill in the art of OCR, data analysis, text and image analysis and determination, can determine which modules and which functions are necessary to implement the various stages and modules of the present invention.

After the initial processing stage, the image with the relevant bounding boxes is then passed to a processing stage. For data types that are considered to be sensitive data (e.g. names and addresses), the processing stage generates similar data of the same type and replaces the sensitive data with suitable replacement data.

The processing stage first determines which of the data in the bounding blocks consist of sensitive data. Since the initial processing stage has already determined which data types are in within which bounding blocks, the processing stage thus only seeks out the relevant data types. Thus, in one implementation, name data (e.g. proper names and corporate names) and address data (e.g. data that consists of at least a number and a street) are determined. Then, suitable replacement data for each of the sensitive data is generated. This can be done with reference to a database of suitable names and/or name/address elements that can then be used to randomly generate the suitable replacement data. Once the replacement data has been generated for each instance of the sensitive data, the replacement data is then inserted into the image in a suitable manner to thereby mask and/or overwrite or obscure the original sensitive data with the replacement data. The replacement data is adjusted so that the replacement data matches the font, size, style, spacing, etc. of the sensitive data. This ensures that the replacement text of the replacement data is seamlessly blended into the document.

It should be clear that randomly generating the replacement data may include the use of a database of name/address elements with elements being randomly selected from the database and then concatenated to generate the replacement data. As an example, a random name may be generated by first selecting a first name from a database of known/common first names (e.g. Bill, William, Jane, Joe, Tom, Stacey, etc., etc.). Then, a database of known/common last names is accessed to randomly select a common/known last name (e.g. Smith, Kim, Park, Singh, Fletcher, Cooper, etc., etc.). These two random elements can then be concatenated to result in a random replacement name that can be used to replace one or more instances of name data in the image of the document. For addresses, a database of known/common street names is accessed to randomly select a street name (e.g. Park, 1st, 2nd, Main, Wall, River, etc., etc.). Another database with common street name extensions is then accessed to find a random street extension (e.g. Street, Avenue, Place, Way, Crescent, etc., etc.). These address elements can then be concatenated to result in a street name. For a street number, a suitable random number generator can generate a street number to be used with the street name A random city name can also be used in conjunction with the above noted methods for generating addressed. Other randomly generated replacement data can be used to replace other sensitive data. As an example, a randomly generated number can be used in place of an instance of a social insurance number or social security number. With respect to company identities, random company names may also be generated by randomly selecting one or more company name elements from a database and then concatenating these elements to form a random replacement company name. Telephone numbers may also be randomly generated or a known fake number may be inserted into the document. As an example, one can randomly generate an area code and use the 555 exchange with a randomly generated four digit number to result in a known fake number, e.g. (212) 555-4243.

It should, of course, be clear that the contents of the database noted above need not be fake or random data. There may be instances when one desires to insert real data into a document in place of the sensitive data originally present in that document. For such instances, a suitable database containing the real data points that is to be inserted into the documents may be used.

As an alternative to the above, instead of generating a new replacement data point for each piece of sensitive data, a specific replacement name/address can be used for each instance of an address or a name Thus, as an example for this alternative, each instance of a name would be replaced with a specific name such as John Doe while each instance of an address would be replaced by a specific replacement address such as 742 Evergreen Terrace, Springfield. A specific fake telephone number may also be used to replace all instances of telephone numbers in the document.

For clarity, any of the following may be considered sensitive data in a document and may be replaced by suitable replacement data as noted above: names, addresses, telephone numbers, social insurance/social security numbers, health insurance numbers, license plate numbers, company names, website addresses, email addresses, vehicle identification numbers, IP addresses, insurance policy numbers, credit card numbers, identification card numbers, dates of birth, blood types, bank account data, and medical prescription data. For further clarity, the term "sensitive data" may include not just text data but also image data, audio data, or any type of data that a user, a corporate entity, or an organization may not want to be made available to anyone but himself or itself. Thus, the term "sensitive data" may be defined in a contextual manner such that what may be considered sensitive data in one context may not be considered sensitive data in another context. As well, "sensitive data" may also encompass logos, corporate logos, or any other image that may be present in an image of a document. Thus, if a logo is sensitive data, that that logo may be tagged and/or replaced by suitable replacement data. For logos, suitable replacement data may include a generic logo, a generic image, a suitable generated image, and/or a block that effectively blocks and/or removes the sensitive data from the image of the document.

For even greater clarity, in some implementations, any data that can be deemed to be personal data can be encompassed by the term "sensitive data". It should thus be clear that "personal data" or "sensitive data" may include any information relating to an identified or identifiable natural person and that an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person. "Sensitive data" may also encompass personal data relating to the inherited or acquired genetic characteristics of a natural person which give unique information about the physiology or the health of that natural person and which result, in particular, from an analysis of a biological sample from the natural person in question. Similarly, "sensitive data" may also include 'biometric data' or personal data resulting from specific technical processing relating to the physical, physiological or behavioural characteristics of a natural person, which allow or confirm the unique identification of that natural person, such as facial images or dactyloscopic data. "Sensitive data" may also include personal data related to the physical or mental health of a natural person, including the provision of health care services, which reveal information about that person's health status. In addition, "sensitive data" may include data that may be of use in the analysis or identification of or prediction of a natural person's performance at work, economic situation, health, personal preferences, interests, reliability, behaviour, location, or movements.

In one implementation of the present invention, the output of the system is a listing of the various clusters of data within the document. Each cluster's parameters, contents, location/position, and the parameters of the cluster's contents are associated with each cluster. This output can thus be used by a machine learning system to determine the desired and/or relevant contents of document.

For the above implementation, the sensitive data within the various clusters of data within the document can be replaced within the cluster and prior to the data being processed by the machine learning system. Thus, the system of the present invention would process, determine, and locate the sensitive data within a document's image and, prior to the document being processed by a machine learning system that would use the data in the document, the system would replace that sensitive data with suitable replacement data. As such, the sensitive data would not form part of a data set for training the machine learning system. It should be clear, however, that even if the sensitive data itself does not form part of a data set for training, the context or characteristics of the original sensitive data is preserved and forms part of the training data set, especially after the sensitive data has been replaced by replacement data. The placement, positioning, and nature of the sensitive data would form part of the training data set but the actual sensitive data itself would not form part of the training data set.

In yet another implementation of the present invention, the image of the document, the data in each of the clusters or in each of the bounding boxes is classified by data type. For a classification implementation, the various clusters of data within the document are classified into a number of specific classes of data cluster. As an example, clusters can be classified as an address cluster (e.g. an address block in an invoice or statement), a document title/type cluster (e.g. a block indicating an invoice or a statement), a data cluster, an item description cluster (e.g. a description of an item itemized in an invoice, receipt, or statement), a signature cluster, a name cluster (e.g. a salutation block in a letter or an "attention" block in a statement/invoice), a logo cluster, a notation cluster (e.g. a handwritten note block in an annotated document), and email address cluster (i.e. a cluster containing an email address), etc., etc. This classification allows for ease of determining the data type of the data within a cluster and/or within a bounding box. Such a measure would also ease the burden of generating a suitable replacement data point to be used in replacing sensitive data within a cluster and/or within a bounding box.

In one alternative, the present invention can be implemented using a number of modules not unlike the modules or stages noted above. In this implementation, a document's image is received at an input module. The contents of the document are then divided into clusters whose positions/locations within the document and whose positions/locations relative to other clusters are determined. Based on the positioning/location of specific clusters within the document and/or the contents of the clusters, these clusters are classified as having specific types of data such as names, addresses, and monetary totals. In addition to cluster position, other considerations may be used to determine the type of data contained in the clusters. These considerations may include the location of a cluster relative to other clusters, the size of a cluster, and the presence or absence of specific text in a cluster. Once the type of data in a cluster has been determined, the relevant data can be tagged as being sensitive data or not. Once the clusters have been determined and their contents also determined, the nature of the data is then found. If sensitive data is found in the various clusters, then suitable replacement data is then generated and then inserted in the document in lieu of the sensitive data. It should, of course, be clear that if the document is known previously, the location and/or positioning of the different types of specific data on that document may be preconfigured within the system such that the system would not need to analyze the image and/or the document to determine the location of these pieces of data.

Figure 2:
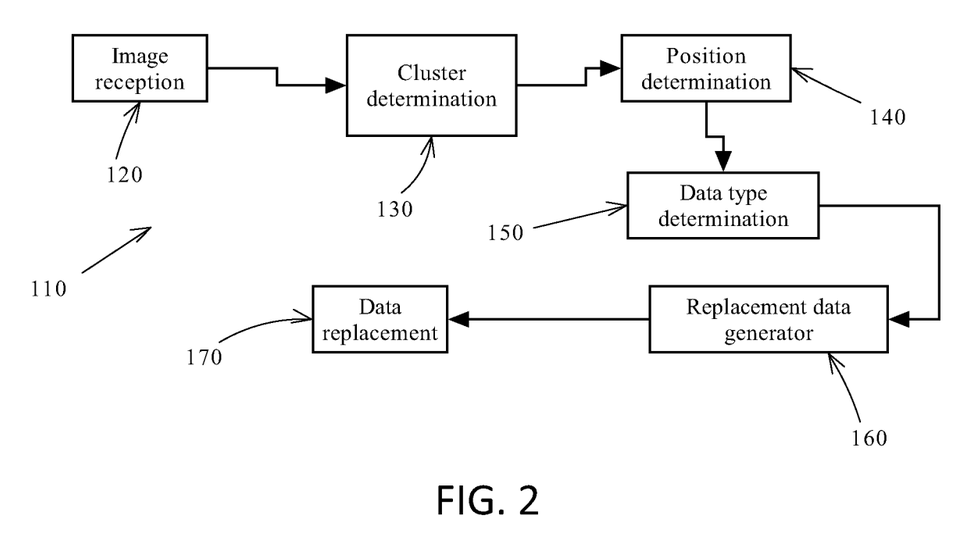
FIG. 2 is a block diagram of a configuration of as system according to another aspect of the present invention.

Referring to FIG. 2, a block diagram of a system according to one aspect of the present invention is illustrated. The system 110 includes an image reception module 120, a cluster determination module 130, a position determination module 140, a data type determination module 150, a replacement data generation module 160, and a data replacement module 170. The system receives an image of a document, determines the clusters of data within the document using the image, and then determines the position/location of the various clusters within the document. As well, the system determines the position/location of the clusters relative to other clusters. The system then determines the type of data present in one or more clusters in the document based on that cluster's position/location and/or the content of the cluster. In addition, the nature of the data in the one or more clusters (i.e., whether the data is sensitive data or not) is determined. Based on the type of data present in the one or more clusters, suitable replacement data is generated and this replacement data is inserted into the image of the document.

In the system of FIG. 2, the image reception module 120 receives the image of the document and may perform pre-processing steps such as adjusting the parameters of the image such as contrast, sharpness, color, etc. to render the image easier or at least less difficult to process. The cluster determination module 130 then takes groups of data within the image and determines which data forms which clusters. The position determination module 140 then determines each cluster's absolute position (or location) within the document and also each cluster's position relative to the other clusters. The data type determination module 150 then analyzes one or more clusters to determine the type of data within the cluster based a number of factors which may include that cluster's position/location. This position used to determine the data within the cluster may be the cluster's absolute position (in terms of pixel distance or size) in the document or the cluster's position relative to other clusters (again in terms of pixel distance or size).

Once the type of data in the cluster is determined, an analysis of the data to determine whether the data is sensitive or not is made. Based on the results of this analysis, suitable replacement data can then be generated and then inserted into the document. It should be clear that the sensitivity of the data may also depend simply on the nature of the data. As an example, all addresses may be treated as sensitive data and, similarly, all proper names may also be treated as sensitive data. It should also be clear that the determination as to whether a piece of data is sensitive or not is not necessarily a binary matter but may be based on probabilities and/or on confidence levels. Thus, the system may identify a specific piece of data and may assign a probability or a confidence level that that piece of data is of a specific data type (e.g. a confidence level that a piece of data is an address or a name of a person). In addition, the system may assign a probability that the potentially identified data is of a sensitive nature (e.g. a confidence level that the data (which may be a proper name of a person) is sensitive since it identifies the subject of the document). Based on any suitable combination of confidence levels, the system may thus proceed to remove/replace the piece of data (if the confidence level is above a predefined threshold), to not do anything to the data (if the confidence level is below a predefined threshold), or may flag the data for review by a user (if the confidence level is close to the predefined threshold). Other configurations are, of course, possible and may be dependent on the desired tolerance and end results for the system.

With the sensitive data being determined, the replacement data generator 160 then generates suitable replacement data for the sensitive data found in the document. The generated replacement data is then inserted, by the data replacement module 170, into the image of the document to replace the sensitive data. In some implementations, the replacement data may have the same characteristics of the sensitive data being replaced. For such implementations, the replacement data may have the same color, font, size, and/or shade as the sensitive data being replaced. Such an implementation may thus produce replacement data that is, in terms of visual characteristics, indistinguishable from the sensitive data being replaced. For such implementations, analysis of the sensitive data would result in not just the type of data of the sensitive data but would also result in an identification of the visual and/or textual characteristics of the sensitive data (e.g. font, font size, character size, character spacing, color, character pitch, background color, foreground color, etc., etc.). Such characteristics of the sensitive data can thus be used to format and/or process the replacement data to result in replacement data that is visually indistinguishable from the original sensitive data.

For purposes of this document, "position" can be taken to mean the place in the image where a cluster is found and this "position" is quantifiable in terms of pixels, pixel distance, or some other form of distance measurement from one or more fixed points in the image or the document. Similarly, the term "location" can be taken to mean the area or region where a cluster may be found within the image or the document. Thus, as an example, a cluster may have a location that is in the upper right quadrant of the image or in the lower half of the image. Similarly, as another example, a cluster may have a position that is x pixels from the right edge of the image and is y pixels from the top edge of the image. It should be clear that, to a person skilled in the art, depending on the implementation of the system, the terms "position" and "location" may be used interchangeably.

Figure 3:
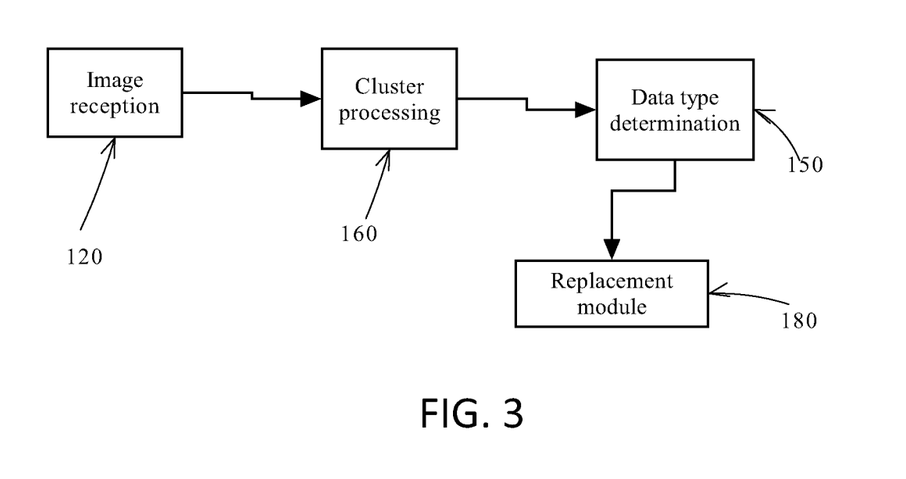
FIG. 3 is a variant of the system in FIG. 2.

It should be clear that the system illustrated in FIG. 2 represents just one possible implementation of the system of the present invention. Other implementations are, of course, possible. As another possible implementation, FIG. 3 shows a variant where the image reception module 120 and the data type determination module 150 are the same as in FIG. 2. In this variant, the functions of the data replacement generator module 160 and the data replacement module 170 are combined in a single module, the replacement module 180. In the variant in FIG. 3, the functions of modules 130 and 140 are combined in a single cluster processing module 160 whose output is processed by the data type determination module 150. In one implementation, the output of the cluster processing module 160 includes a listing of the clusters (including any concatenated text in each cluster) along with a position indicator for each cluster. This cluster and cluster position listing can then be analyzed by the data type determination module 150 to determine the data within one or more of the clusters. Also in this variant, the functions of modules 160 and 170 are combined into module 180. Module 180 thus generates replacement data and inserts this replacement data into the relevant clusters in the document.

It should be clear that the data type determination module 150 may have multiple implementations. In one implementation, a rule based module is used to determine the data within one or more of the clusters in the document. The rules implemented by the module may take into account the absolute position of the cluster, its relative position relative to one or more other clusters, the length of the cluster, as well as the content of that cluster to determine the data within that cluster. As an example, if a cluster's position is close to the top of the document, is adjacent to two smaller clusters, and is of medium size in terms of the font size of the letters or words within the cluster, then that cluster may have an address within it. To explain the foregoing, in a business letter, the address block for the addressee of the letter is close to the top of the document and is between the date and the reference lines. Since the date line is a small cluster and the reference line (i.e. the RE: line) is also a comparatively small cluster, then the cluster between these two small clusters is usually the address block.

It should be clear that if the desired result is to identify the address, date, and total dollar amounts from a document, in a machine learning system, a number of similarities and patterns can be extrapolated by the system from the samples. In a rules-based system, the extrapolation may need to be determined beforehand and then hard coded into rules within the system. In usual business documents, generally, the address block is near the top of the document. As well, for invoices and receipts, the total for the invoice or receipt is usually set apart near the bottom of the document. The date is usually near the top of the document and is usually adjacent or next to an address cluster. From samples of typical business documents, a rule based data determination module can be constructed. Of course, given the variability of the structure of these business documents, such a rule based module may not perform as well as expected.

In another implementation, a neural network may be used in the data type determination module. The neural network may be tasked with classifying the various clusters as a date cluster, an address cluster, or as a total amount cluster. Clusters that are larger than a certain size (i.e. clusters with more than a predetermined amount of characters) may be discarded as they would constitute body clusters and would not be a date, address, or total amount cluster. The neural network may be trained with a data set that includes different business letters, invoices, receipts, purchase orders, claim forms, pay slips, and other business-type documents whose clusters have already been classified as date, address, and total amount clusters. By using such a data set, the neural network can be trained to determine which of the clusters in a business document contains these data points (i.e. an address, a date, and a total amount).

Referring back to FIG. 3, it should also be clear that the cluster processing module 160 may also use a neural network to determine the various clusters in a document and to determine each cluster's position within the document. The result can then be fed into a neural network equipped data type determination module 150 to find the date, address, and total clusters (or other clusters). The data within these clusters found can then be identified and, if necessary, replaced by suitable replacement data.

It should also be clear that further processing of the various clusters in a document can be performed to ensure that the desired clusters have been found. As an example, for a date cluster, the text within the cluster can be analyzed to scan for text corresponding to a month's name or abbreviation. Similarly, a potential address cluster can be analyzed to search for text that usually occurs in an address (e.g. "street", "st.", "avenue", "ave.", etc.). The relative positioning of a cluster can also be taken into account when determining the type of data within that cluster. As an example, a mid-sized cluster near the top of the document and between two smaller sized clusters may be an address cluster in a letter. Similarly, a mid-sized cluster at the very top of the document (and adjacent or above one or two smaller clusters) may be an address cluster in a receipt. As another example, a mid-sized cluster just above the largest cluster may be an address cluster. Absolute positioning of a cluster may also be determinative of the data within it. As an example, the cluster at the top of every receipt has the address within it. As well, the total amount on any invoice or receipt is at the bottom (or very near the bottom) of a document. Of course, this analysis and processing may be coded into a rule based data determination module or it may be introduced as a consideration when training a suitable neural network.

In yet another variant, the output of the system in FIG. 1 may be used as a suitable input to a neural network for data type determination as noted above. The neural network can then determine which cluster contains which data and, accordingly, which data will need to be processed and/or replaced.

Figure 4:
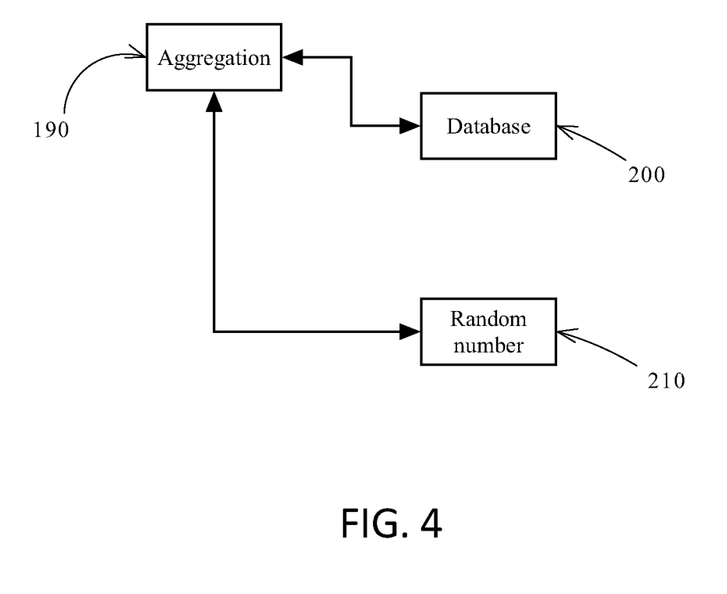
FIG. 4 is a block diagram detailing the submodules in one of the components in the systems of FIGS. 2 and 3.

It should be clear that the replacement data generation module 160 may have a configuration as illustrated in FIG. 4. From FIG. 4, it can be seen that the module may have an aggregation submodule 190 that receives a request for replacement data. The request would include the type of replacement data being requested (e.g. an address, a name, a telephone number, etc., etc.). Based on this request, suitable replacement data elements may be gathered from a database submodule 200 and suitable number elements may be generated from a random number generator submodule 210. The various replacement data elements are then sent back to the aggregation submodule 190 that then assembles the various elements into a suitable replacement data point. This generated replacement data can then be sent out as an output of the module 160.

While the above discussion makes mention of OCR, it should be clear that the present invention may also be applicable to handwritten text and/or handwritten data. Thus, handwritten text may be recognized and then suitably tagged and replaced by suitable replacement data. Such replacement data may also be processed or generated such that the replacement data inserted into the image looks like or has the characteristics of handwritten text. Of course, the replacement data may also be typed text or other suitable types of text data as necessary or desired.

Another alternative implementation of the present invention may use a data generation module that generates data without reference to a database. A suitable name/data generation module may be used for such an implementation. As an example, a module having a generative adversarial network that generates suitable names, addresses, and other data may be used.

As an alternative, while the above discussion details replacing the sensitive data with replacement data that is of the same type as the sensitive data, the sensitive data may also simply be removed from the image of the document. For such an alternative, the sensitive data may be masked by an image block of a solid color to effectively delete the sensitive data from the document. For such an alternative, the replacement data would simply be a digital image block that effectively removes and/or masks the sensitive data.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A system for replacing sensitive data in documents, the system comprising:
    a non-transitory storage medium storing instructions thereon; and
    at least one processor operatively connected to the non-transitory storage medium, the at least one processor, upon executing the instructions, being configured for:
       receiving an image of at least one document;
       clustering said image of each of said at least one document into different cluster fields, each cluster field containing respective cluster data content and having a respective cluster position;

recognizing specific types of data in said different cluster fields to thereby determine if said data in said different cluster fields comprises sensitive data based on cluster data content and the cluster position to assign a respective sensitivity to said data, said sensitivity being indicative of a sensitivity level of said data; and replacing sensitive data of at least one specific type of data in said different fields with replacement data based on the respective sensitivity being above a threshold.

2. The system according to claim 1, wherein said sensitive data of at least one specific type of data comprises at least one of:
names of persons;
addresses of persons
telephone numbers of persons;
gender;
confidential information;
physical characteristics;
financial information;
health related information;
business related information;
names of corporate entities;
addresses of corporate entities;
dates;
credit card numbers;
bank account data;
social security/social insurance numbers;
personal identification data; and
blood types.

3. The system according to claim 1, wherein said clustering comprises placing bounding boxes around each of said different cluster fields.

4. The system according to claim 1, wherein elements of said replacement data are randomly selected from a database.

5. The system according to claim 1, wherein said replacement data is created by concatenating data elements selected from a database.

6. The system according to claim 1, wherein a portion of said replacement data is randomly generated.

7. The system according to claim 1, wherein at least a portion of said replacement data is created by concatenating data elements selected from a database.

8. The system according to claim 1, wherein each instance of said sensitive data of the at least one specific type is replaced by a specific piece of replacement data.

9. The system according to claim 1, wherein said recognizing specific types of data in said different cluster fields to thereby determine if said data in said different cluster fields comprises the sensitive data is further based on one of: a presence or an absence of specific words in said data.

10. The system according to claim 1, wherein said sensitive data and said replacement data replacing said sensitive data are of a same type of data.

11. The system according to claim 1, wherein said replacement data is a block that effectively removes said sensitive data from said image.

12. The system according to claim 1, wherein said replacement data is generated by a portion of said system.

13. The system according to claim 1, wherein said system recognizes a visual appearance of said sensitive data.

14. The system according to claim 13, wherein said visual appearance includes at least one of: font, size, style, and spacing of said sensitive data.

15. The system according to claim 13, wherein replacement data matches said visual appearance of sensitive data to be replaced.

16. The system according to claim 15, wherein said replacement data seamlessly blends into said documents.

17. A method for replacing sensitive data in documents, the method being executed by at least one processor, the method comprising:
receiving an image of at least one document;
clustering said image of each of said at least one document into different cluster fields, each cluster field containing respective cluster data content and having a respective cluster position;
recognizing specific types of data in said different cluster fields to thereby determine if said data in said different cluster fields comprises sensitive data based on cluster data content and the cluster position to assign a respective sensitivity to said data, said sensitivity being indicative of a sensitivity level of said data; and
replacing sensitive data of at least one specific type of data in said different fields with replacement data based on the respective sensitivity being above a threshold.

18. The method according to claim 17, wherein said document is a business document.

19. The method according to claim 18, wherein said sensitive data is at least one of:
names of persons;
addresses of persons
telephone numbers of persons;
gender;
confidential information;
physical characteristics;
financial information;
health related information;
business related information;
names of corporate entities;
addresses of corporate entities;
dates;
credit card numbers;
bank account data;
social security/social insurance numbers;
personal identification data; and
blood types.

20. The method according to claim 17, wherein said replacement data is a block that effectively removes said sensitive data from said image.

* * * * *